United States Patent
Salomaa et al.

(10) Patent No.: US 9,183,826 B2
(45) Date of Patent: Nov. 10, 2015

(54) APPARATUS AND METHOD FOR PROVIDING PASSIVE AMPLIFICATION

(75) Inventors: Jyri Salomaa, Espoo (FI); Nan Jiang, Ulm (DE); Cao Cheng, Union City, CA (US); Leslie Fan, Beijing (CN); Ronan Jezequel, Plougastel Daoulas (FR)

(73) Assignee: Nokia Technologies Oy, Espoo (FI)

( * ) Notice: Subject to any disclaimer, the term of this patent is extended or adjusted under 35 U.S.C. 154(b) by 770 days.

(21) Appl. No.: 13/512,968

(22) PCT Filed: Dec. 2, 2009

(86) PCT No.: PCT/CN2009/075258
§ 371 (c)(1),
(2), (4) Date: May 31, 2012

(87) PCT Pub. No.: WO2011/066682
PCT Pub. Date: Jun. 9, 2011

(65) Prior Publication Data
US 2012/0237058 A1 Sep. 20, 2012

(51) Int. Cl.
*H04R 3/00* (2006.01)
*G10K 11/02* (2006.01)
*H04M 1/04* (2006.01)
*H04R 1/30* (2006.01)
*H04M 1/03* (2006.01)

(52) U.S. Cl.
CPC ............. *G10K 11/025* (2013.01); *H04M 1/04* (2013.01); *H04R 1/30* (2013.01); *H04M 1/035* (2013.01); *H04R 2499/11* (2013.01)

(58) Field of Classification Search
CPC ............ H04M 1/04; H04R 31/00; H04R 1/30
USPC .............................................. 381/111; 29/594
See application file for complete search history.

(56) References Cited

U.S. PATENT DOCUMENTS

| 8,220,680 B1 * | 7/2012 | Everson et al. ............... 224/486 |
| 8,320,597 B2 * | 11/2012 | Griffin et al. ................. 381/339 |
| 2005/0243522 A1 | 11/2005 | Nilsen et al. |
| 2007/0223745 A1 | 9/2007 | Feng et al. |

FOREIGN PATENT DOCUMENTS

| CN | 1946619 A | 4/2007 |
| GB | 2377116 A | 12/2002 |
| JP | 2004-328672 A | 11/2004 |
| WO | 00/24178 A1 | 4/2000 |
| WO | 2007/111650 A1 | 10/2007 |
| WO | 2007111650 | 10/2007 |

OTHER PUBLICATIONS

"Loudspeaker Stand Hole", Yuyao Huahua Electroacoustic Factory, Retrieved on May 29, 2013, Webpage available at : www.tootoo.com/d-rp24272658-loudspeaker-stand-hole/#.UaWhM0Cnrxo.

(Continued)

*Primary Examiner* — Sonia Gay
(74) *Attorney, Agent, or Firm* — Harrington & Smith

(57) ABSTRACT

An apparatus comprises a substantially horn shaped structure configured to amplify sound from a speaker of a device wherein the apparatus comprises packaging of the device.

20 Claims, 11 Drawing Sheets

(56) References Cited

OTHER PUBLICATIONS

"AirCurve", fits iPhone 3G and original iPhone, Griffin Technology, Retrieved on May 29, 2013, Webpage available at : https://store.griffintechnology.com/aircurve.

International Search Report and Written Opinion received for corresponding International Patent Application No. PCT/CN2009/075258, dated Sep. 2, 2010, 12 pages.

Office Action received for corresponding Chinese Patent Application No. 200980162724.3, dated Jan. 15, 2013, 3 pages of Office Action, No English Language Translation available.

Office Action received for corresponding Chinese Application No. 200980162724.3, dated Mar. 27, 2014, 6 pages.

Office Action received for corresponding Chinese Application No. 200980162724.3 , dated Jun. 20, 2013, 2013, 9 pages.

Office Action received for corresponding Chinese Application No. 200980162724.3 , dated Sep. 22, 2013, 6 pages.

Office Action received for corresponding Philippine Patent Application No. 12012501092, dated Oct. 1, 2013, 1 page.

* cited by examiner

APPARATUS AND METHOD FOR PROVIDING PASSIVE AMPLIFICATION

RELATED APPLICATION

This application was originally filed as PCT Application No. PCT/CN2009/075258 filed Dec. 2, 2009.

TECHNICAL FIELD OF THE INVENTION

The present application relates to a method and apparatus. In some embodiments the method and apparatus relate to a passive amplifier and some further embodiments relate to packaging of a device having a speaker, the packaging comprising a passive amplifier for the speaker.

BACKGROUND OF THE INVENTION

Some portable devices comprise integrated speakers for creating sound such as playing back music or having a telephone conversation. The loudness of the integrated speakers is important especially in environments where the ambient noise levels are high, even indoors. The loudness of the integrated speakers in a portable device is important for perception of ringtones of a mobile telephone. In some countries the loudness of the integrated speakers is important for listening to FM radio broadcasts.

In some parts of the world a portable device with an integrated speaker may be the only device the user owns which is capable of playing music. For example, a user may only be able to play music using a loudspeaker of a mobile telephone. The loudness and quality of sound from an integrated speaker is even more important if a user is solely reliant on an integrated speaker of a portable device for music playback.

It is known to increase the loudness of integrated speakers by actively amplifying sound by electronic solutions. For example, circuitry comprising large transducers, components for signal processing and other electrical modifications have been used. Other solutions further comprise external loudspeakers. It is also common to use two speakers where their output is acoustically coupled, for example by mutual acoustic coupling, to increase the loudness. Typically digital signal processing (DSP) may increase loudness by using one or more of the following: digital gains, equalization (EQ), single or multiple dynamic range controllers (DRC) and transducer protection. It is understood that there may be more additional systems or algorithms which are designed for use in digital signal processing. For example, in addition there may be and/or other systems in a playback chain such as electrical filters. Disadvantageously, the additional components are expensive and use additional power which can reduce portable device operating time dramatically.

Another technique for increasing the loudness of an integrated speaker is using an external accessory. One such accessory is a desk stand or a cradle for a hands free car kit which provides passive amplification for a portable device. However, external accessories providing passive amplification are expensive and bulky. This means the user cannot easily transport the desk stand and has to keep it in one place. Furthermore manufacture of such external accessories is complex and requires an expensive manufacturing set up and equipment.

SUMMARY OF THE INVENTION

In a first aspect there is provided an apparatus comprising: a substantially horn shaped structure configured to amplify sound from a speaker of a device wherein the apparatus comprises packaging of the device.

Preferably the horn shaped structure is configured to be modified from a packaging arrangement to an amplifying arrangement.

Preferably the packaging arrangement is a flat arrangement and horn shaped structure is expandable to an amplifying arrangement.

Preferably the apparatus further comprises a box.

Preferably the horn shaped structure is integral with the box.

Preferably the apparatus is configured to be an internal divider of a box in the flat arrangement.

Preferably the box comprises a detachable portion adjacent to a mouth of the horn shaped structure.

Preferably the apparatus comprises an interface configured to acoustically couple the speaker of the device with the horn shaped structure.

Preferably the interface comprises a seal configured to abut the speaker for reducing sound wave leakage.

Preferably the apparatus is made from one or more of the following: paper, cardboard, plastics material.

Preferably the device is operable when the device is connected to the apparatus.

Preferably a wall of the apparatus defines a portion of the horn such that when the apparatus cooperates with a surface of another object, the apparatus and the surface define the complete horn shaped structure.

Preferably the surface of the another object is the base of the box.

Preferably the horn shaped structure is a passive amplifier.

Preferably the apparatus is configured to cooperate with another horn shaped structure for increasing the amplification.

Preferably the apparatus comprises a tray configured to cooperate with the device.

Preferably the horn shaped structure is integral with the tray.

Preferably the another horn shaped structure is a tray according to a preferred embodiment.

Preferably the tray is configured to slot into the horn shaped structure such that the second horn shaped structure is acoustically coupled to the horn shaped structure.

Preferably the tray is a pulp tray.

In a second aspect there is provided a kit of parts comprising: a device having a speaker for making sound; and an apparatus according to the first aspect.

In a third aspect there is provided a blank for manufacture of an apparatus wherein the blank is arranged to be transformed to make an apparatus according to the first aspect.

Preferably the blank is arranged to be cut and folded.

Preferably the blank comprises: at least one predetermined path for cutting the blank for creating a net; and at least one predetermined paths for folding the net.

Preferably the blank comprises: at least one indication for cutting; and at least one indication for folding; wherein the blank is configured to be cut and folded along the respective indications for cutting and folding to make the apparatus.

Preferably the blank is arranged to be moulded.

In a fourth aspect there is provided a method comprising manufacturing an apparatus according to the first aspect from a blank.

Preferably the method comprises: cutting the blank to create a net; and folding the net; wherein on folding and cutting the apparatus is made.

Preferably the method comprises moulding a blank to provide an integral horn shaped structure.

BRIEF DESCRIPTION OF THE DRAWINGS

For a better understanding of the present application and as to how the same may be carried into effect, reference will now be made by way of example to the accompanying drawings in which.

DETAILED DESCRIPTION OF EMBODIMENTS OF THE INVENTION

The following describes apparatus and methods for providing passive amplification using packaging of a portable device.

Figure 1:
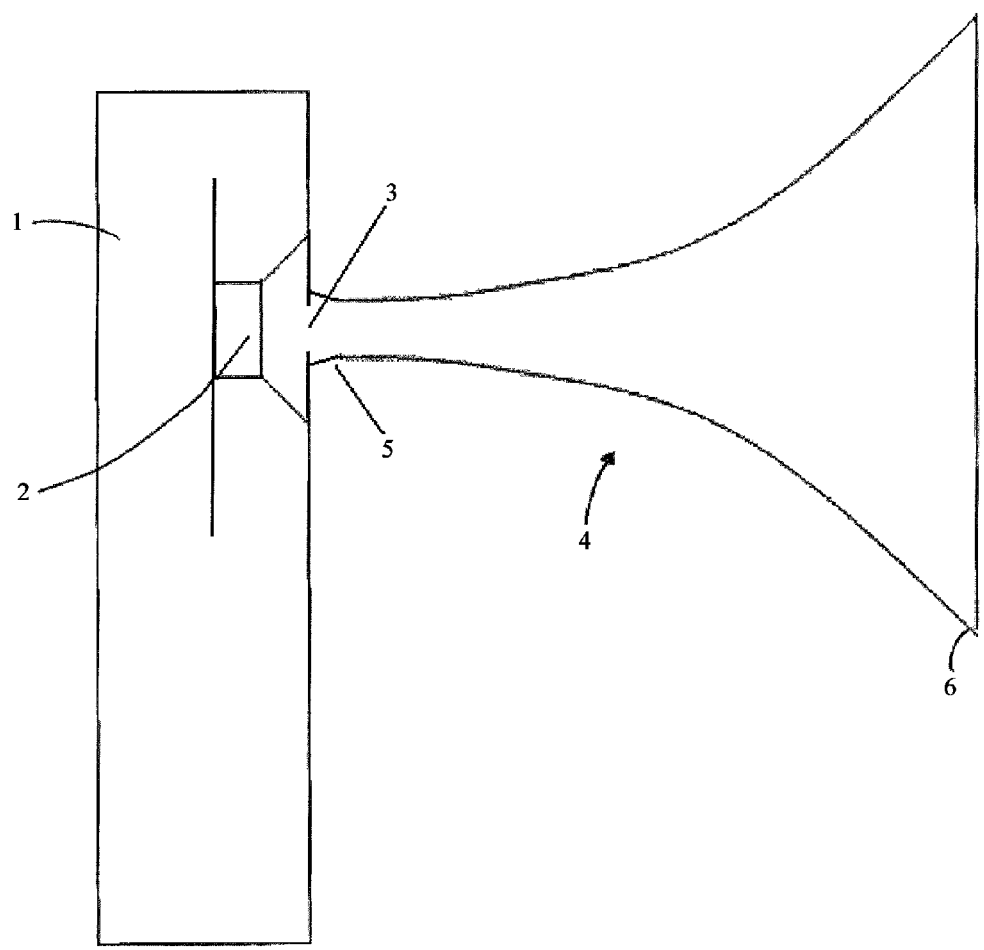
FIG. 1 illustrates a schematic representation of a passive amplifier of some embodiments.

FIG. 1 discloses a schematic representation of a passive amplifier. A portable device or apparatus 1 comprises a transducer 2. The transducer 2 may be an integrated speaker such as an integrated hands free speaker (IHF). The integrated handsfree speaker may be a dynamic or moving coil, a piezoelectric transducer, an electrostatic transducer or a transducer array comprising microelectromechanical systems (MEMS). Additionally or alternatively the transducer comprises a multifunction device (MFD) component having any of the following: combined earpiece, integrated handsfree speaker, vibration generation means or a combination thereof. The portable device 1 may be a mobile phone, portable audio device, or other means for playing sound. The portable device 1 has a sound outlet 3 for permitting sound waves to pass from the integrated speaker 2 to the exterior environment.

The portable device 1 is in some embodiments a mobile terminal, mobile phone or user equipment for operation in a wireless communication system. In other embodiments, the electronic device is any suitable electronic device configured to generate sound, such as for example a digital camera, a portable audio player (mp3 player), a portable video player (mp4 player). In other embodiments the apparatus may be any suitable electronic device with an speaker configured to generate sound.

The portable device 1 comprises a sound generating module which is linked to a processor. The processor is further linked to a display. The processor is further linked to a transceiver (TX/RX) and to a memory.

In some embodiments passive amplification of the sound from the sound outlet 3 is achieved with a horn-shaped structure 4. In some embodiments the horn-shaped structure comprises a throat portion 5 which widens to a mouth portion 6. The horn-shaped structure 4 is connected to the sound outlet 3 at a throat 5 of the horn-shaped structure 4. The horn-shaped structure may be any of the following: a conical horn, an exponentially horn, a tractrix horn or the horn-shaped structure may comprise some characteristics of these types of horn. That is, the horn-shaped structure is substantially horn-shaped and may not be a perfect horn.

The horn-shaped structure may comprises a throat 5 which has a small cross sectional area and the horn-shaped structure flares to a mouth 6 having a larger cross sectional area than the throat 5. The flaring of the horn-shaped structure 4 means that the sound waves decompress and increase the displacement of the air at the mouth 6 when compared to the throat 5. The horn-shaped structure 4 provides improved acoustic impedance matching between the integrated speaker 2 and the air. In this way, amplification of the sound from the integrated speaker 2 is achieved with the horn-shaped structure 4.

Figure 2A:
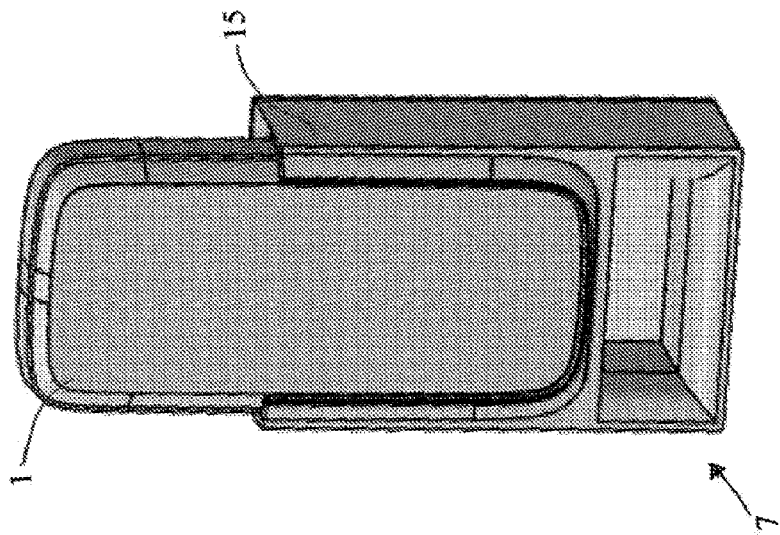
FIGS. 2a and 2b disclose a perspective view of an apparatus according to some embodiments.

FIG. 2a discloses an apparatus 7 which in some embodiments may be at least part of packaging for the portable device 1. The apparatus 7 is configured to be used with the device 1. After the device is unpacked, the apparatus 7 may be retained and is configured to amplify sound from a speaker of the device 1.

The apparatus 7 in some embodiments is a tray 15 configured to cooperate with the device 1. The tray 15 is used for limiting the movement of the device 1 when the device is packaged in a box (not shown). The box may be a sales box in which the device 1 is sold.

The tray 15 comprises a lip 8 and a base 9. The lip 8 is connected to the base 9 by walls 10 defining a device receiving cavity 11. In this way, the device 1 may be slotted into the device receiving cavity 11 with the base 9 on one side of the device 1 and the lip 8 on the other side of the device 1. The depth of the device receiving cavity 11 is defined by the height of the walls 10. In some embodiments the device 1 slots into the tray 15 providing a snug-fit. The tray 15 is configured to cooperate with the shape of the device 1. The tray 15 comprises a sound interface 12 for acoustically coupling the integrated speaker (not shown) of the device 1 to the tray 15.

FIG. 2a discloses the sound interface 12 in the base 9, corresponding to the position of the speaker output of the device when the device is placed in the tray 15. In other embodiments the sound interface 12 is located in a different part of the tray 15. For example, the sound interface 12 may be located in another part of the base 9 or in the walls 10 in order to align with the location of integrated speaker or plurality integrated speakers of the device 1.

Advantageously, the sound interface 12 is aligned with the integrated speaker of the device 1 which reduces the sound wave leakage when the device 1 is playing sound through the integrated speaker. This increases the efficiency of the passive amplification by the apparatus 7. The sound interface 12 is connected to an integral horn 13 via a conduit (not shown). The horn 13 comprises a flared mouth 14 such that a cross sectional area of the mouth 14 is greater than that of the sound interface 12.

Advantageously, the sound interface 12 is mechanically coupled to the integrated speaker of the device 1 with a seal or gasket.

Figure 2B:
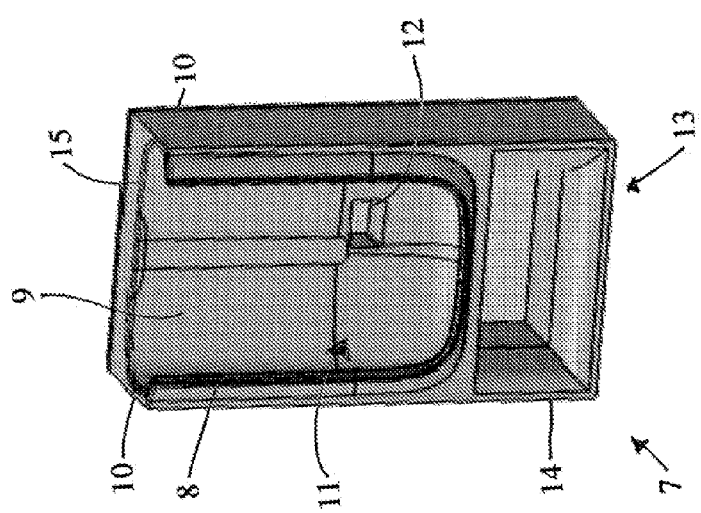

FIG. 2b discloses the packaging tray 15 as described in FIG. 2a used in conjunction with the device 1.

Advantageously, the tray 15 can be carried in a pocket or strapped to a belt or other item of clothing. This means a user may have access to a simple means of increasing the loudness of the integrated speaker of the device 1 when on the move. In some embodiments the tray 15 comprising the integrated horn 13 can increase the loudness by at least 6 dB and possibly 12 dB compared to a devices using the integrated speaker alone.

In some embodiments, the length and shape of the horn is advantageously configured to the portable device and the sound generated by the portable device. The length and shape of the horn is configured to increase the loudness. The horn increases the sensitivity across the frequency response of the playback system wherein the increase is not constant across the range of frequency components. The sensitivity at very high frequencies, for example, at around 10 kHz is less compared to low and mid frequencies. Advantageously in some embodiments the length and shape of the horn are configured to provide a frequency roll off such that very high frequencies and/or low frequencies are filtered out. In an exemplary embodiment, the acoustic performance of the horn acts as an acoustic filter to very high frequencies which the portable device does not normally use when generating sound.

The apparatus 7 has a dual use and prolongs the usefulness of the apparatus 7. Advantageously, at least some parts of the apparatus 7 are recycled for other uses which reduces the amount of undesirable waste. This avoids the tray 15 being thrown away immediately after opening and does not contribute to problems arising from waste disposal.

The tray 15 as illustrated in FIGS. 2a and 2b is a pulp tray in some embodiments. A pulp tray is made from recycled materials such as cardboard or paper. During manufacture of the pulp tray the recycled cardboard and paper are pulped and the pulped material is passed into a mould whereby the pulped material is squeezed and/or heated. The resulting pulp tray 15 has a rigid structure. In order to create conduits and cavities as required for the horn, the pulp tray may be constructed from a plurality of layers. For example, the pulp tray in some embodiments comprises a front and a back which are connected together, with e.g. glue and when the plurality of layers are connected together define the structure of integral horn 13. In some embodiments, tray 15 may be an accessory which is sold separately to the portable device 1. In other embodiments the cavities are defined by a plurality of surfaces and/or layers of the packaging.

Alternatively, in some embodiments the tray is moulded from a plastic material. In other embodiments the material for packaging comprises one or more of the following blow moulded materials, cardboard, containerboard, corrugated fibreboard, corrugated plastic, ethylene vinyl alcohol resin, extruded polystyrene foam, foam material, injection moulded materials, low density polyethylene, liquid packaging board, moulded pulp materials, paper, paperboard, plastic material, polyethylene, polypropylene, polystyrene, polyvinylidene chloride, styrene-acrylonitrile resin, unica, and vacuum formed packaging.

FIG. 3a discloses an apparatus according to some alternative embodiments, which may be at least part of the packaging for the portable device 1. The apparatus 300 is configured to be used with the device 1 to amplify sound similar to the previously discussed embodiments. The apparatus 300 comprises an expandable booster 312 having a horn 302. The structure of the horn 302 is defined by the base 301, walls 303 and top 304. The horn 302 is flared from a narrow throat portion 305 to a wider mouth portion 306.

The throat portion 305 comprises an opening 307 for receiving the device 1. The expandable booster 312 further comprises struts 308 and spine portion 309 for providing rigidity to the horn 302.

The expandable booster 312 is in some embodiments configured to be modified from a packaging arrangement to an amplifying arrangement. In the packaging arrangement the horn 302 is in some embodiments folded flat, as are the struts 308 and the spine portion 309. The expandable booster 312 is foldable from a flat arrangement (not shown) to the amplifying arrangement in which the horn 302 is expanded.

The horn 302 is in some embodiments expandable by virtue of the hinged walls 303. The walls 303 in some embodiments have crease lines 310 bisecting the walls such that in the flat arrangement the walls fold in on themselves. The walls 303 may also have hinges connecting the top 304 and the base 301. This further allows the walls 303 to fold. In some embodiments, the walls 303 have additional fold lines 310.

The horn 302 stays open in the amplifying arrangement by virtue of the rigidity of the walls 303. In some embodiments additional struts or reinforcement portions (not shown) are inserted in the interior of the horn 302 to keep the horn 302 open.

Similarly the struts 308 and the spine portion 309 are also foldable and expandable.

In use, the device 1 is slotted or docked into opening 307 such that the integrated speaker of the device 1 is coupled to the horn 302. The spine portion 309 provides support to the device 1 when the device 1 is docked with the expandable booster 312. The device 1 rests against the spine portion 309 and this enables the device 1 to remain upright when in use. In this way, a user may operate the device 1 whilst the device 1 is inserted in the opening 307. A seal or gasket made from plastic or rubber may be provided in some embodiments allowing the opening 307 to provide better mechanical coupling between the horn 302 and the device 1.

In this way, the expandable booster 312 in some embodiments comprises a larger horn than the tray 15 discussed in previous embodiments. The expandable booster 312 increases the amplification of the sound from the integrated speaker of the device 1 compared to the tray 15 because the horn 302 of the expandable booster 312 is larger than the horn 13 of the tray 15.

Figure 5:
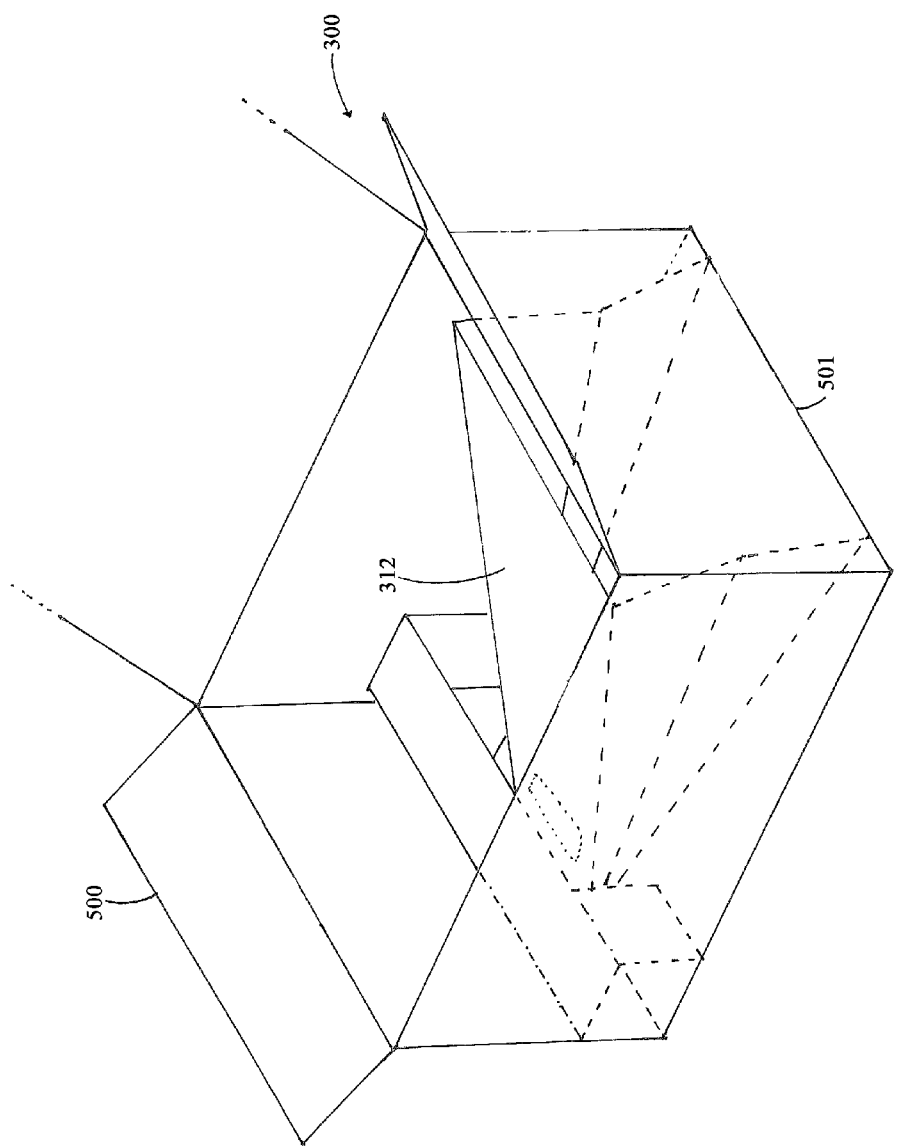
FIG. 5 discloses a perspective view of an apparatus according to some embodiments.

The expandable booster 312 is configured to fit in a box 500 as shown in FIG. 5. Furthermore, the expandable booster 312 advantageously consumes minimal volume of the box because the expandable booster 312 compacts in to a flat packaging arrangement.

In some embodiments, the expandable booster 312 is made from paper or cardboard. In other embodiments the expandable booster 312 may be made of a plastics material. Advantageously, when the expandable booster 312 is made from cardboard, the expandable booster 312 can be made from a recyclable material and reduce problems associated with disposal of the apparatus 300.

Manufacture of the apparatus 300 comprises cutting a preformed blank (not shown). The preformed blank in some embodiments is a predetermined amount of material suitable for manufacturing the apparatus 300. The preformed blank is cut along predetermined cutting paths in order to provide a net for creating the apparatus 300. The net is folded along predetermined folding paths to create the apparatus 300. In some embodiments, the preformed blank comprises indications for cutting and folding the preformed blank for assisting manufacture of the apparatus 300.

In some embodiments, the apparatus 300 is made from a plurality of layers of material, for example cardboard. Alternatively, in other embodiments the plurality of layers comprise different materials for example, a combination of two or more of the following foam, plastic, cardboard, paper, polystyrene or other suitable rigid material. In some other embodiments, layers of cardboard are typically glued together. Additionally or alternatively, in yet other embodiments, the plurality of layers may be connected together using a tab and slot arrangement.

The apparatus 300 may be used in the box 500 for selling the device 1 for dividing the box into different portions. For example, an instruction manual is typically separated from other components in the box 500. In this way, in some embodiments the apparatus comprises an internal divider for the box 500 which may be also used as a passive amplifier. In this way, the lifetime of the use of the packaging is extended after a user opens and unpacks the box 500.

Figure 3:
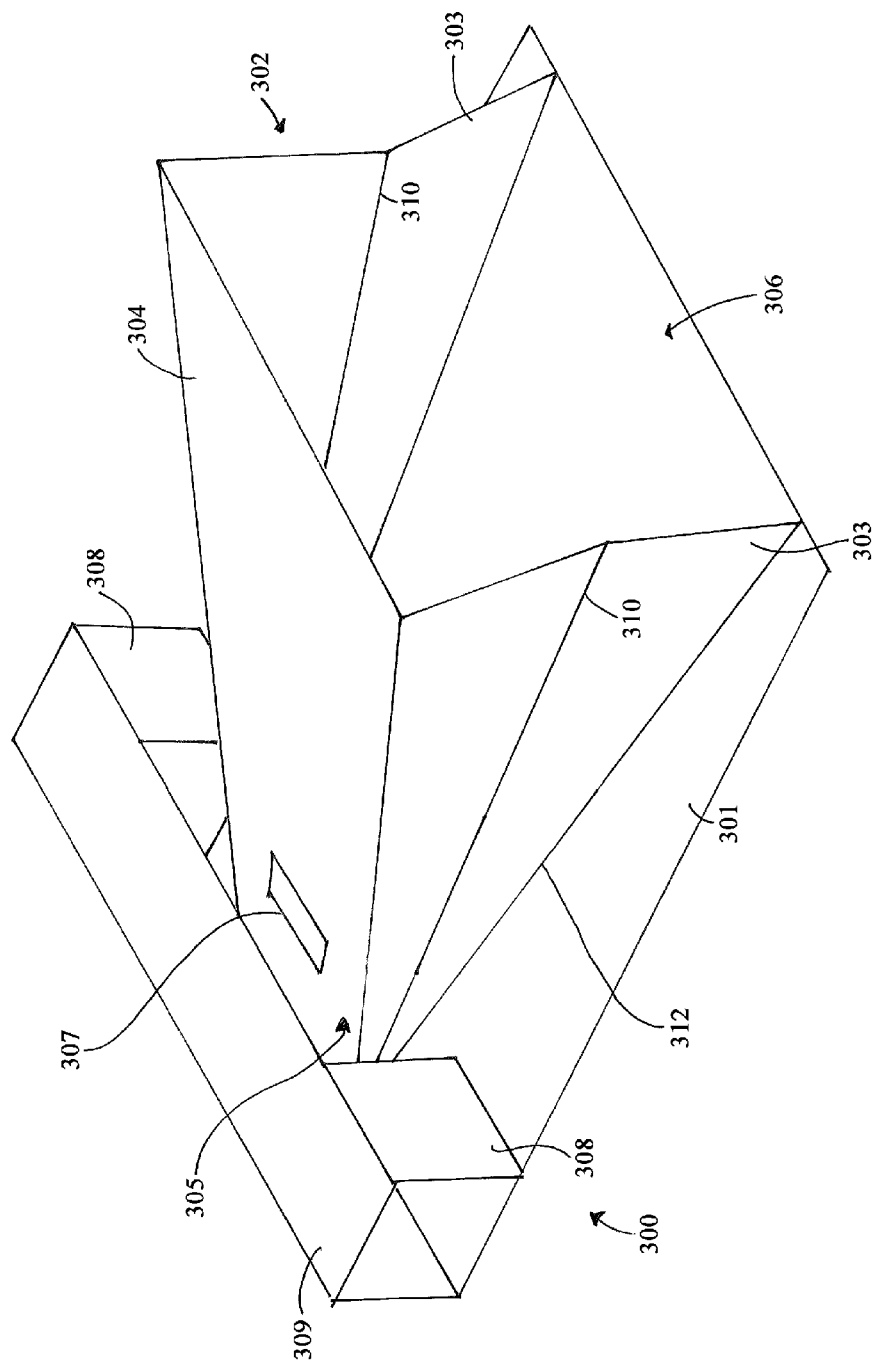
FIG. 3 discloses a perspective view of an apparatus according to some embodiments.
Figure 4:
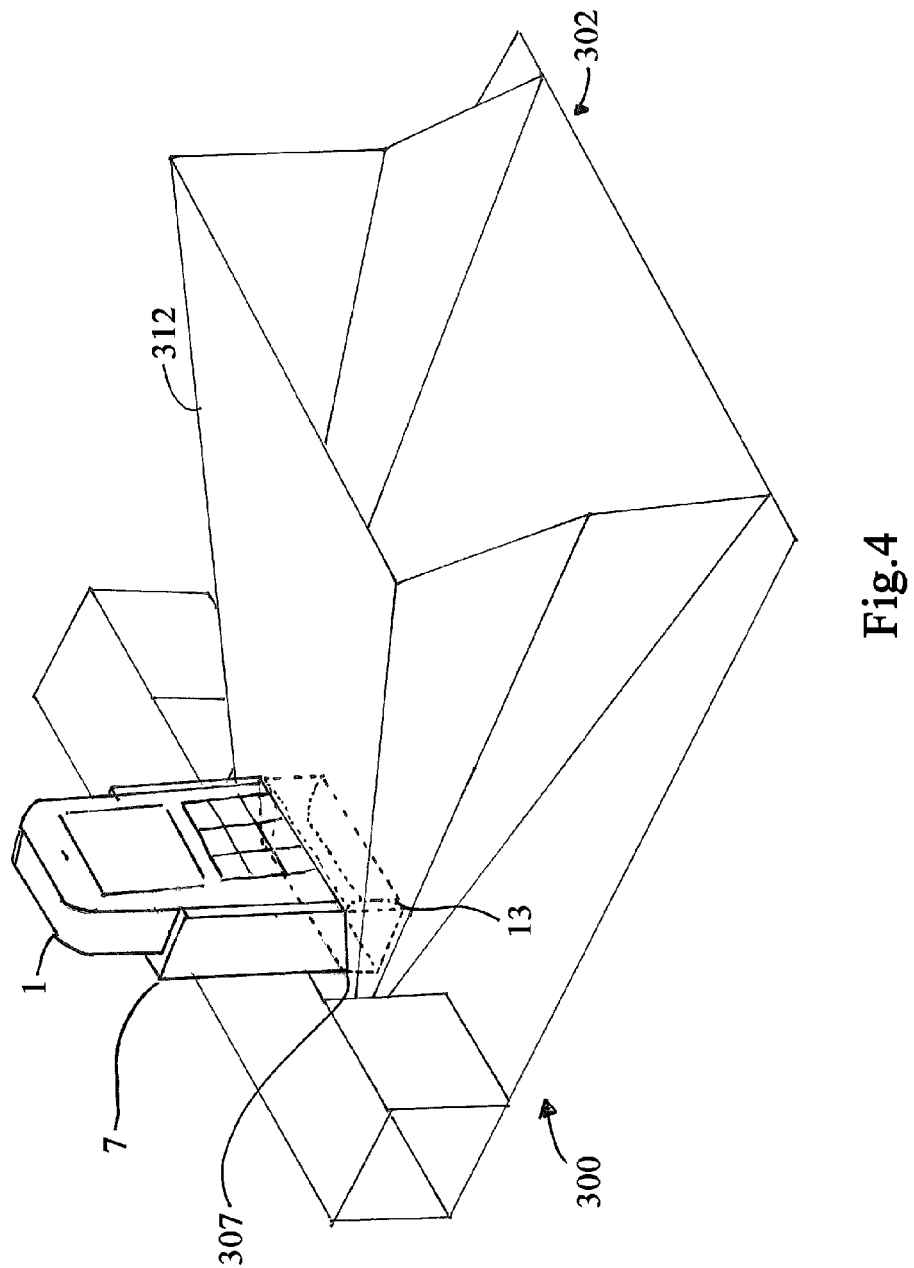
FIG. 4 discloses a perspective view of an apparatus according to some embodiments.

FIG. 4 discloses an apparatus 300 according to some alternative embodiments. The apparatus 300 is the same as the apparatus described in FIG. 3. However, instead of the device 1 being inserted directly into opening 307, the apparatus 7 such as shown in FIGS. 2a and 2b is inserted into opening 307. The apparatus 7 comprises the tray 15 similar as that described in FIGS. 2a and 2b.

In this way, the opening 307 receives the horn 13 of tray 15 such that a horn 13 of tray 15 is coupled to the horn 302 of the apparatus 300. Advantageously, the tray 15 acts as a generic adaptor for boosters such as expandable booster 312. In this way apparatus 300 can remain the same for different products, but the tray 15 varies with the shape and design of the portable device 1.

This means that the combined use of the tray 15 with an integral horn with the expandable booster 312 further increases the resulting loudness of the sound. Use of the tray 15 with the expandable booster 312 provides an increase in signal level of an amount around 6 dB or possibly 12 dB. This reduces the sound wave leakage from the opening 307 because the tray 15 better couples to the integrated speaker than the device 1 on its own. Furthermore the use of a compound horn may increase the passive amplification.

FIG. 5 illustrates an apparatus 300 according to some alternative embodiments. In some embodiments the apparatus 300 comprises the expandable booster 312 and a box 500. The expandable booster is integral with the box 500. For example, the base 306 as shown in FIG. 3 is the base 501 of the box 500. This advantageously reduces the material required to make the apparatus 300 by using the existing material of the box 500. In one embodiment, the expandable booster 312 is glued to the base 501 of the box 500.

Figure 6:
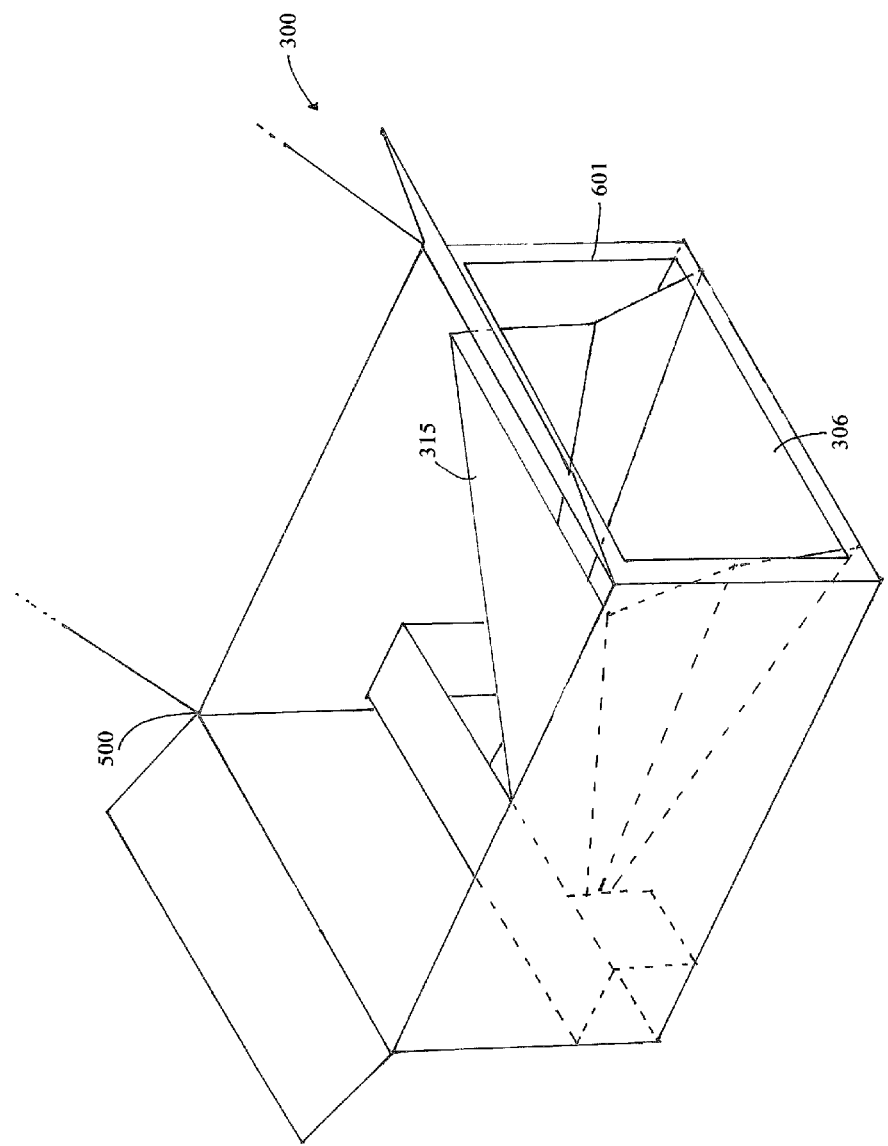
FIG. 6 discloses a perspective view of an apparatus according to some embodiments.

FIG. 6 illustrates a modification of some embodiments described in FIG. 5. The box 500 has a removable portion (not shown) to provide a window 601 adjacent to the mouth 306 of the horn 302. In this way, the amplified sound is output from the mouth of the apparatus 300 at the side of the box 500. This means that the horn 302 of the apparatus 300 is as large as possible and can be used in the box 500, which provides protection to the expandable booster 312 and additional rigidity to the expandable booster 312.

Figure 7B:
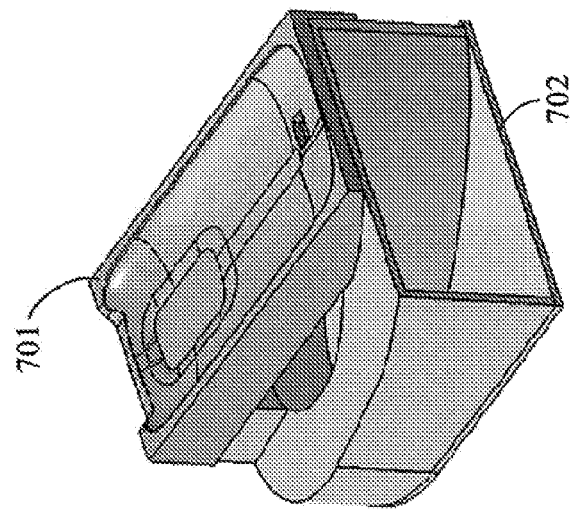
FIGS. 7a and 7b disclose a perspective view of an apparatus according to some embodiments.
Figure 7A:
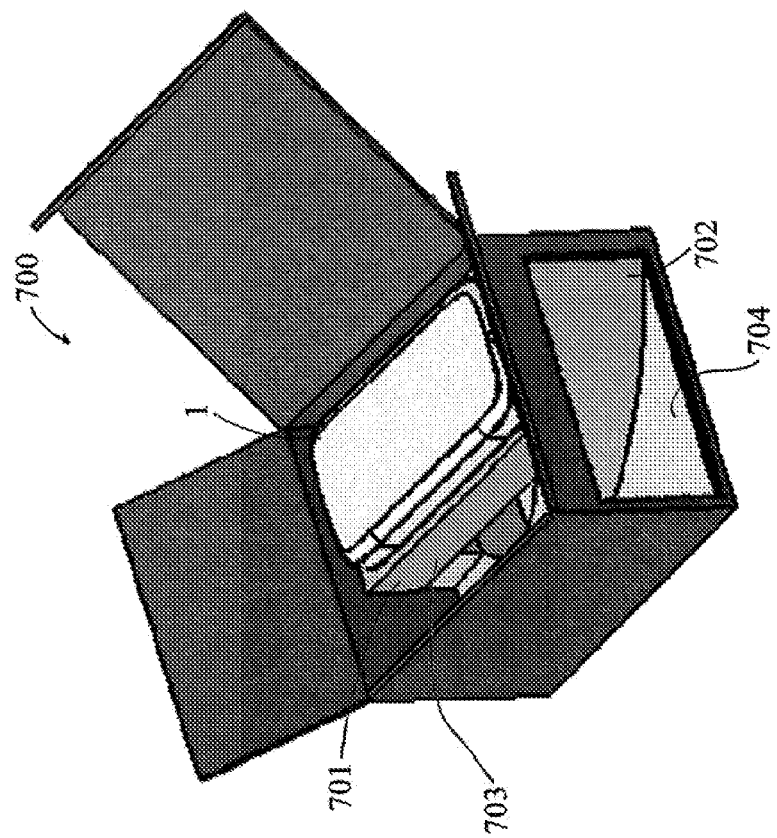

FIGS. 7a and 7b disclose an apparatus 700 according to some embodiments, which may be at least part of the packaging of the device 1. In particular FIG. 7a discloses a perspective view of the apparatus 700 comprising an apparatus 701 and an apparatus 702. Apparatuses 701 and 702 respectively comprise a tray 703 a booster 704. FIGS. 7a and 7b disclose a device 1 being connected to the tray 703 and the booster 704 cooperating with the tray 703.

In contrast to the expandable booster 312 of the previous embodiments, the booster 704 has a rigid structure but still provides the amplifying properties as discussed previously. For clarity FIG. 7b discloses the arrangement of the apparatus 702 with the apparatus 701 without the box 500.

Figure 8:
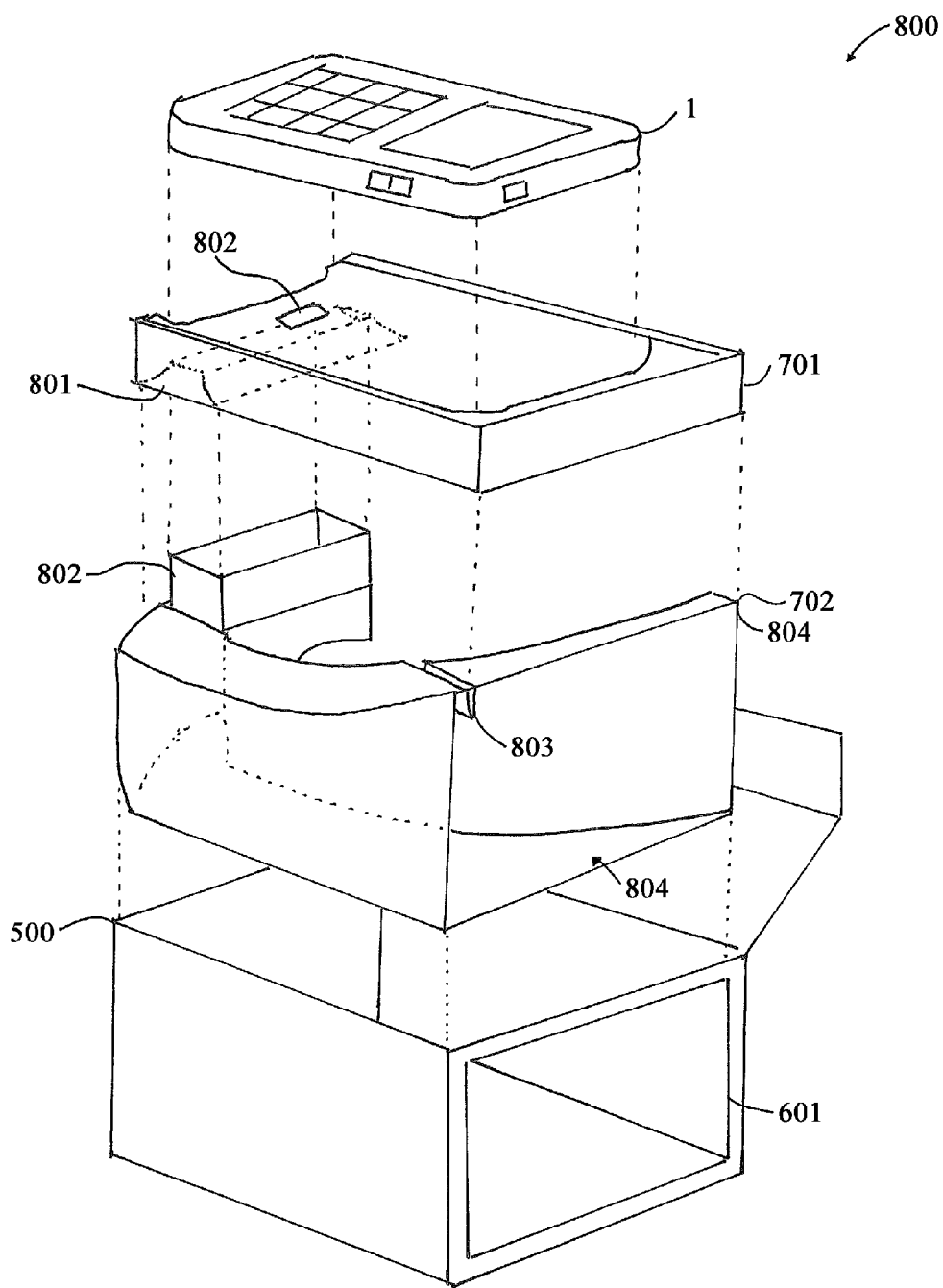
FIG. 8 discloses an expanded perspective view of an apparatus according to some embodiments.

FIG. 8 discloses an expanded view of apparatus 800 comprising the apparatuses 701, 702 as shown in FIGS. 7a and 7b.

Device 1 cooperates with the tray 703 similar to the tray 7 as shown in FIGS. 2a and 2b. However, the tray 703 has a horn 801 which is located on the reverse side to that shown in FIGS. 2a and 2b. The sound interface 802 couples with the integrated speaker of device 1 and couples with the horn 801.

The tray 703 slots over booster 704. The mouth of horn 801 may in some embodiments fit inside projection 802 to provide a socket-plug type connection which advantageously physically couples the tray 703 and with the booster 704. This means that sound wave leakage between the tray 703 and the booster 704 when coupled together is minimised. The tray 703 is in some embodiments arranged to slot into trough 803 and over a corner 804 to further physically attach the tray 703 to the booster 704. The arrangement of the tray 703 and the booster 704 are configured to fit inside the box 500. The box 500 comprises a window 601 which permits the output of amplified sound from the mouth 804 of the horn of the apparatus 702.

The tray 703 and the booster 704 in some embodiments are formed from a moulding process similar to that of the pulp tray as discussed in previous embodiments.

Figure 9:
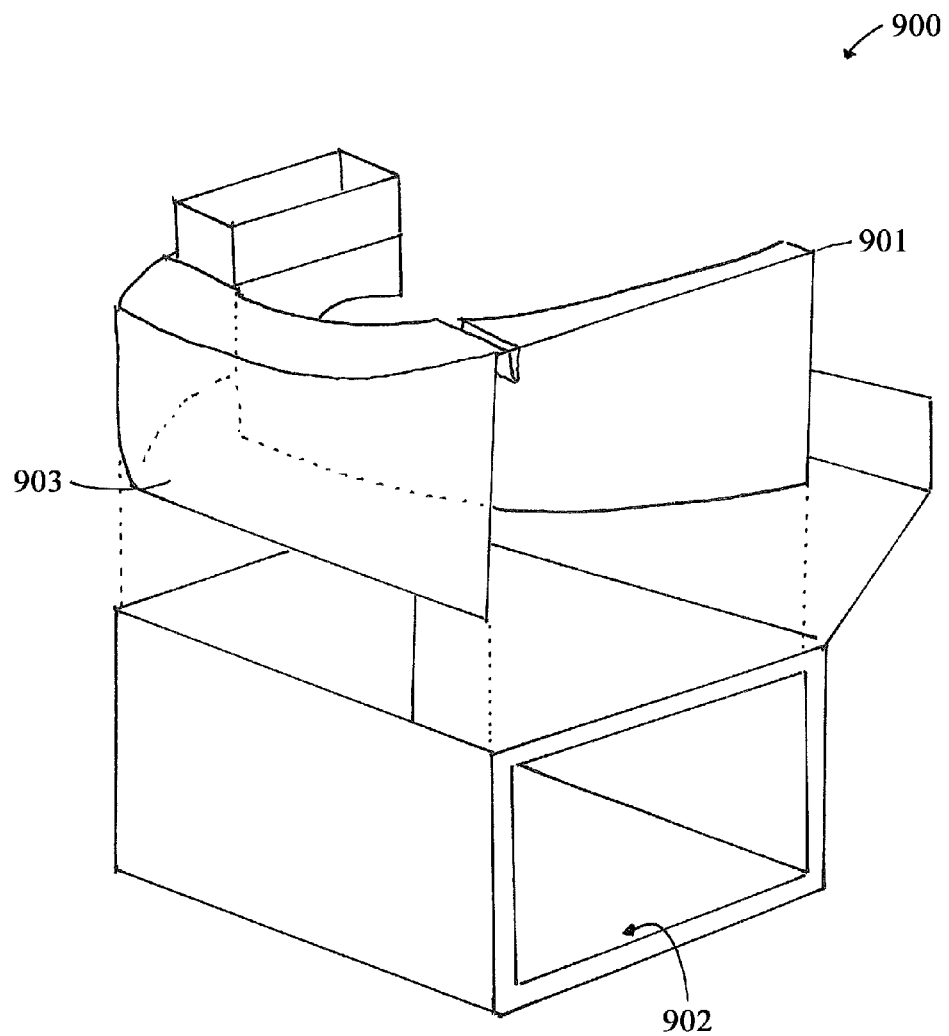
FIG. 9 discloses an expanded perspective view of an apparatus according to some embodiments.

FIG. 9 discloses an apparatus 900 according to yet other embodiments. The apparatus 900 comprises a booster 901. The booster 901 is the same as the booster 704 as described in FIG. 8 except that the booster 901 does not have a base. In other words one of the faces of the booster 901 is open.

Instead in some embodiments, the base of the box 902 forms the missing portion of the horn of the apparatus 900. When the booster 901 is inserted into the box 500 in a first orientation, the base of the box 902 and the booster 901 define a complete horn cavity. In this way, the amount of material required for the apparatus 900 is reduced.

In an alternative embodiment, the horn cavity is defined by the booster 901 and the portable device 1. That is, an exterior surface of the portable device forms one surface of the horn shaped structure when the portable device couples with the booster Furthermore, the booster 901 may be inserted into the box in a second orientation approximately rotated 180° from the first orientation, the amplifying arrangement, to the packaging arrangement. That is, the booster 901 is in an amplifying arrangement as shown in FIG. 9 but may in some embodiments be turned upside down to orientate the booster 901 into the packaging arrangement. In the packaging arrangement, the apparatus 900 provides a trough 903 in which components such as an instruction manual and charger may be located when the device 1 is packaged in the box 500. This advantageously makes packing and unpacking the box easier if the booster 901 does not have a base.

In some embodiments, the increase in signal level due to the apparatus comprising a horn is around 12 dB compared to a device's maximum volume using the integrated speaker alone.

Figure 10:
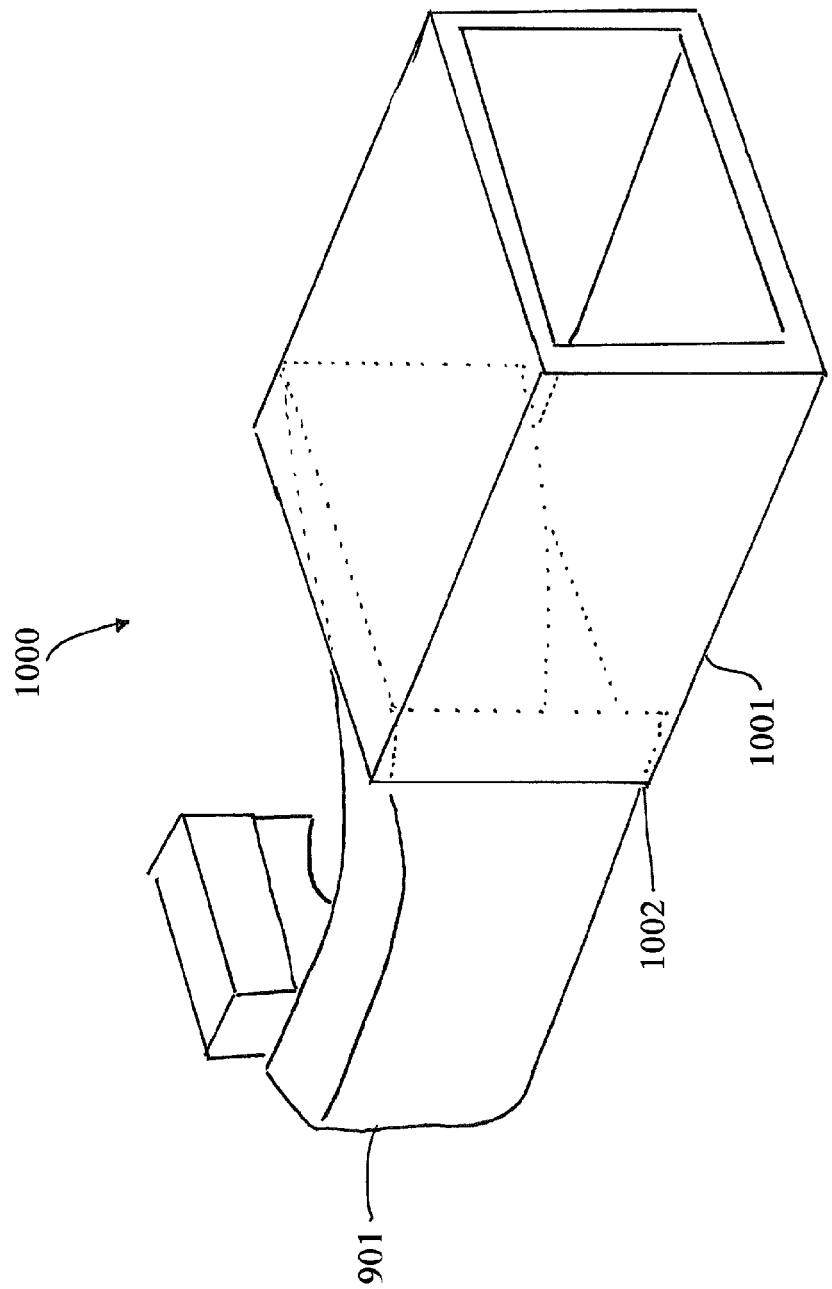
FIG. 10 discloses a perspective view of an apparatus according to some embodiments.

FIG. 10 discloses an apparatus 1000 according to yet other embodiments. The apparatus 1000 comprises a booster 901. The booster 901 is the same as illustrated in FIG. 9 or FIG. 8. The booster 901 is partially inserted in box 1001. The box 1001 comprises window 601 which is similar to the boxes described in previous embodiments. The box 1001 additionally or alternatively opens at side end 1002. The box 1001 comprises flaps (not shown) for opening and closing the box. FIG. 10 illustrates the box 1001 in an opened state.

The booster 901 is moveable with respect to the box 1001. In this way the proportion of the booster 901 inside the box is variable. For example, the position of the booster 901 is variable from one configuration whereby the booster 901 is completely inserted in box 1001 to another configuration whereby the booster 901 is only just inserted in the box 1001. This means that a user can control the loudness of amount of passive amplification by varying the length of the horn type structure of the apparatus. Advantageously the control of the amount of amplification does not require an electronic solution. In some embodiments the booster 901 comprises a plurality of indicators for indicating relative positions of the booster 901 to the box 1001. The indicators may correspond to different levels of amplification.

In some embodiments, the booster comprises an adaptor (not shown) for connecting the mouth of the booster 901 with the open end 1002 of the box 1001. In some embodiments the adaptor is an extendible structure which slides over the mouth of the booster 901 and inside the open end 1002 of the box 1001. In other embodiments the adaptor is a flexible connection. Advantageously the flexible connection allows different positioning of the booster 901 with respect to the box 1001.

In some embodiments, a portable device comprises a plurality of integrated speakers. The apparatus may comprise a plurality of sound interfaces, each sound interface configure to mechanically couple a separate integrated speaker. The sound interfaces are connected to respective horn type structures. This means that each integrated speaker is individually amplified. Alternatively, each sound interface is connected to a single horn type structure.

In some other embodiments the apparatus comprises a plurality of sound interfaces wherein one sound interface is configured to cooperate with an integrated speaker of the portable device and another sound interface is configured to cooperate with an earpiece transducer of the portable device. The sound interfaces are connected to respective horn type structures. This means that the integrated speaker and the earpiece transducer are individually amplified. In some embodiments the earpiece transducer is configured to generate sound in a lower frequency range compared to the integrated speaker. In this way the earpiece transducer is configured to be a bass reflex port and the integrated speaker is the main driver unit. Advantageously each horn-type structure is modified to cooperate with the integrated speaker and the earpiece transducer having regard for the parameters and frequency of the integrated speaker and the earpiece transducer.

In some embodiments the portable device 1 comprises a sensor (not shown) configured to detect that the portable device 1 is being used with the apparatus. The sensor may comprise a photometer or other type of light sensor configured to detect the ambient light levels. In this way, a processor of the portable device is configured to receive a signal from the sensor when the ambient light level has decreased and to receive a signal that the integrated speaker is generating sound.

In some embodiments there may additionally or alternatively be an accelerometer or other sensor for detecting whether the portable device is positioned at a specific position in the box. On detection of the specific position of the portable device in the box, one or more sensors may send a signal indicating position information to the processor of the portable device. The processor is configured to determine the position of the device from the received signal and adjust digital signal processing accordingly.

In other embodiments there may additionally or alternatively be a sensor monitoring the sound pressure level around the outlet of the speaker of the portable device. The sensor may detect changes to the sound pressure level when the device is coupled with the apparatus 300 because the acoustic impedance changes when the device is coupled to the apparatus 300. The pressure sensor is configured to send a signal to the processor. The signal may comprise an indication of a change in the sound pressure level around the outlet of the speaker. The processor is configured to determine that the portable device is coupled to the apparatus 300 from the received signal and adjust the digital signal processing accordingly.

The processor determines on the basis of information received from one or more sensors that the portable device is being used with the apparatus 300 comprising a horn type structure. Alternatively or additionally, the sensor is a proximity sensor for detecting that the integrated speaker of the portable device is inserted into the opening 307 or adjacent to the sound interface 12. Furthermore, the portable device may be configured to receive user input to specify that the portable device is being used with the apparatus 300. After the processor determines that the device 1 is acoustically coupled to the apparatus, the processor is configured to control the sound output of the portable device 1 accordingly. In some embodiments, the processor may be configured to tune the play back of sound for loudness. In this way loudness may be increased further on determination of the device being used with the apparatus comprising a horn type structure. Additionally or alternatively, the processor may be configured to modify the sound for quality and better sound performance. For example, the processor is configured to modify sound generation to tune the sound according to the frequency response of the apparatus. In some embodiments, the processor is configured to determine the type of horn structure acoustically coupled to the portable device and configure the sound generation dependent on the type of horn structure.

Figure 11A:
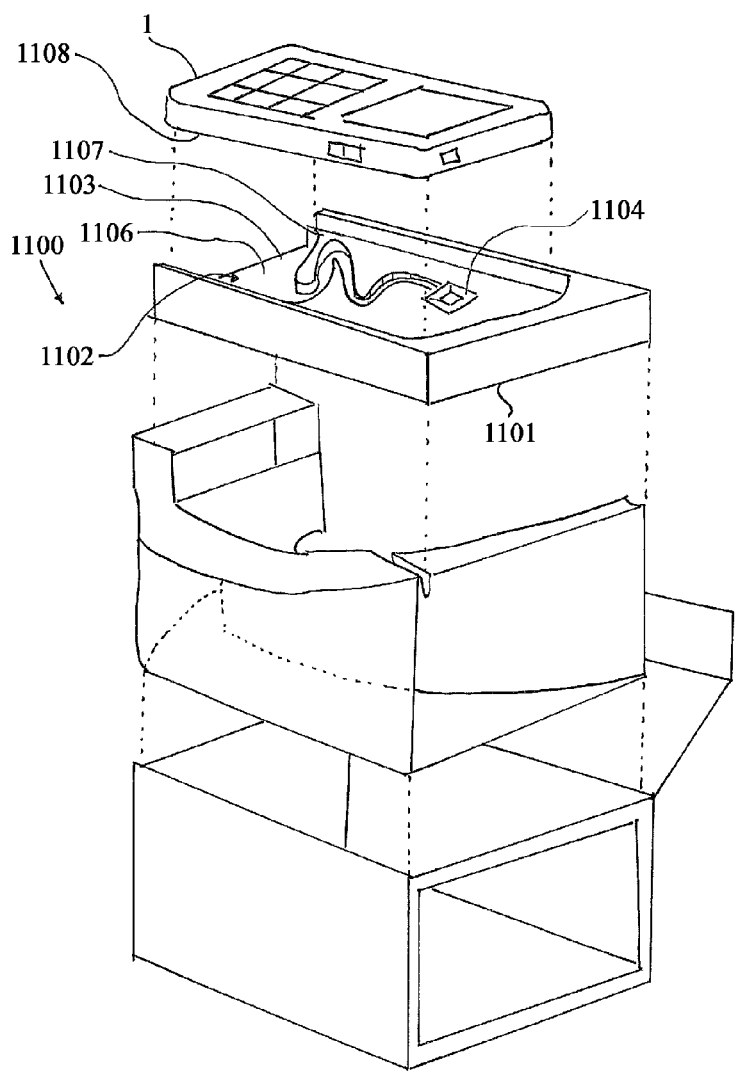
FIGS. 11a and 11b disclose an expanded perspective view and a side view of an apparatus according to some embodiments.
Figure 11B:
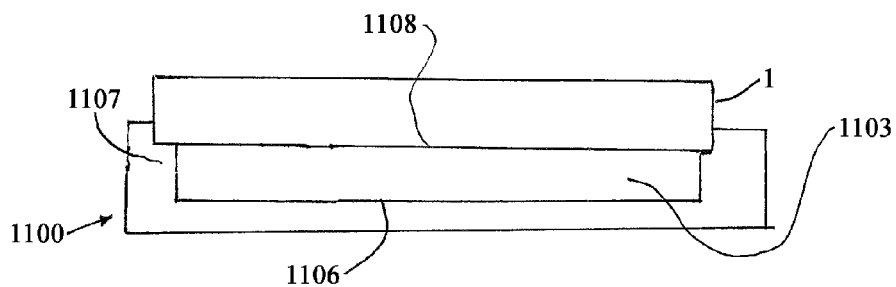

FIG. 11a shows an expanded perspective view of an apparatus 1100 according to some alternative embodiments. The apparatus 1100 is similar to the apparatus 800 as illustrated in FIG. 8. Apparatus 1110 comprises a tray 1101 configured to cooperate with portable device 1. The tray 1101 is similar to tray 15 as described in FIGS. 2a and 2b. The tray 1101 comprises an integral horn shaped structure 1102 having a sound outlet 1103 and sound interface 1104. The tray 1101 comprises a partial horn cavity defined by the base 1106 and raised walls 1107. The portable device 1 is configured to couple with the tray 1101 such that the portable device is connected to the raised walls 1107. When the portable device is coupled to the tray 1101 the exterior surface 1108 of the portable device 1 and the tray 1101 define a complete horn cavity. FIG. 11b illustrates a side view of the apparatus 1100 in use with the portable device 1. FIG. 11b shows the sound outlet 1103, part of the complete horn cavity, defined by the base 1106, the raised walls 1107 and the exterior surface of the 1108 of the portable device.

It shall be appreciated that the term portable device is user equipment. The user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

For example, in some embodiments the method of manufacturing the apparatus may be implemented with processor executing a computer program.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
a substantially horn shaped structure configured to increase the loudness for sound from a speaker of a device when the horn shaped structure is acoustically coupled to the speaker of the device, wherein the apparatus comprises at least part of packaging for the device, and wherein the horn shaped structure is configured to be modified from a packaging arrangement to an amplifying arrangement.

2. An apparatus according to claim 1 wherein the packaging arrangement is a flat arrangement and the horn shaped structure is expandable to an amplifying arrangement.

3. An apparatus according to claim 1 wherein the apparatus further comprises a box.

4. An apparatus according to claim 3 wherein the horn shaped structure is integral with the box.

5. An apparatus according to claim 3 wherein the apparatus is configured to be an internal divider of a box in a flat arrangement.

6. An apparatus according to claim 3 wherein the box comprises a detachable portion adjacent to a mouth of the horn shaped structure.

7. An apparatus according to claim 1 wherein the apparatus comprises an interface configured to acoustically couple the speaker of the device with the horn shaped structure.

8. An apparatus according to claim 7 wherein the interface comprises a seal configured to abut the speaker for reducing sound wave leakage.

9. An apparatus according to claim 3, wherein a wall of the apparatus defines a portion of the horn such that when the apparatus cooperates with a surface of another object, the apparatus and the surface define the complete horn shaped structure.

10. An apparatus according to claim 9 wherein the surface of the another object is the base of the box.

11. An apparatus according to claim 1 wherein the apparatus comprises a tray configured to cooperate with the device.

12. An apparatus according to claim 11 wherein the horn shaped structure is integral with the tray.

13. A kit of parts comprising:
a device having a speaker for making sound; and
an apparatus according to claim 1.

14. A blank for manufacture of an apparatus wherein the blank is arranged to be transformed to make an apparatus according to claim 1.

15. A blank according to claim 14 wherein the blank is arranged to be cut and folded.

16. A blank according to claim 15 wherein the blank comprises:
- at least one predetermined path for cutting the blank for creating a net; and
- at least one predetermined paths for folding the net.

17. A blank according to claim 14 wherein the blank comprises:
- at least one indication for cutting; and
- at least one indication for folding;
- wherein the blank is configured to be cut and folded along the respective indications for cutting and folding to make the apparatus.

18. A method comprising manufacturing an apparatus according to claim 1.

19. A method according to claim 18 wherein the method comprises:
- cutting the blank to create a net; and
- folding the net;
- wherein on folding and cutting the apparatus is made.

20. A method according to claim 19 wherein the method comprises moulding a blank to provide an integral horn shaped structure.

* * * * *